United States Patent [19]

Hase et al.

[11] Patent Number: 4,805,212
[45] Date of Patent: * Feb. 14, 1989

[54] AUTOMATIC TELEPHONE DIALING METHOD AND APPARATUS

[75] Inventors: Kazuo Hase; Kazuo Nakano, both of Tokyo, Japan

[73] Assignee: OKI Electric Industry Co., Ltd., Tokyo, Japan

[*] Notice: The portion of the term of this patent subsequent to Apr. 26, 2005 has been disclaimed.

[21] Appl. No.: 144,012

[22] Filed: Jan. 14, 1988

Related U.S. Application Data

[63] Continuation of Ser. No. 759,911, Jul. 29, 1985, Pat. No. 4,741,029, which is a continuation-in-part of Ser. No. 741,737, Jun. 4, 1985, abandoned.

[30] Foreign Application Priority Data

Jun. 15, 1984 [JP] Japan .................... 59-122005

[51] Int. Cl.⁴ .................................. H04M 1/27
[52] U.S. Cl. ........................... 379/359; 379/355
[58] Field of Search ............ 379/354, 355, 362, 364, 379/359, 418, 216

[56] References Cited

U.S. PATENT DOCUMENTS

| | | | |
|---|---|---|---|
| 3,670,111 | 6/1972 | Bukosky et al. | 379/354 |
| 4,039,761 | 8/1977 | Nicoud et al. | 379/354 |
| 4,348,550 | 9/1982 | Pirz et al. | 379/357 |
| 4,473,720 | 9/1984 | Hegi | 379/354 |
| 4,481,382 | 11/1984 | Villa-Real | 379/61 |
| 4,567,326 | 1/1986 | Sato et al. | 379/355 |
| 4,741,029 | 4/1988 | Hase et al. | 379/359 |

FOREIGN PATENT DOCUMENTS 58-111468 7/1983 Japan .

Primary Examiner—James L. Dwyer
Attorney, Agent, or Firm—Wenderoth, Lind & Ponack

[57] ABSTRACT

There are disclosed automatic telephone dialing method and apparatus that can be commonly used in a plurality of countries for telephone-related devices such as telephone sets. According to the automatic telephone dialing method, control data for controlling various signals to be delivered to a circuit for placing a call are stored in a storage unit, and the signals are issued while their timing is controlled by the control data stored in the storage unit at the time of initiating a call. The automatic telephone dialing apparatus is composed of a storage unit for storing control data for controlling the timing of signals to be delivered to a circuit in initiating a call, an input unit for entering an address, a dialing signal issuing unit for issuing a dialing signal to the circuit, and a control unit for controlling the timing of delivery of the dialing signal according to the control data stored in the storage unit when issuing the dialing signal to the circuit through the dialing signal issuing unit and also for controlling the storage unit, the input unit, and the dialing signal issuing unit.

1 Claim, 6 Drawing Sheets (1) R, $X_{P1} \sim X_{Pm}$ (2) R, $X_{P1} \sim X_{Pm}$, Q, $X_1 \sim X_n P$ (3) Q, $X_1 \sim X_n$

Fig. 4

| PARAMETERS / COUNTRIES | T₁ sec | T₂ sec | T₃ sec | T₄ sec | T₅ sec | T₆ sec | t_f msec | REMARKS |
|---|---|---|---|---|---|---|---|---|
| A | ≤4 | — | T₄=T₁+T₃ ≤20 | | 0.8~1.2 -2t_f | ≤60 | 10~100 | |
| B | — | — | ≤3.5 | ≤8 | — | ≤60 | — | BUSY TONE TO BE DETECTABLE IN T₆ |
| C | — | 1 | T₂+T₃=T₄ ≤20 | | — | ≤60 | — | |
| D | — | — | T₃=T₄ ≤60 | | — | ≤60 | 40~100 | TO DETECT CIRCUIT CURRENT IN T₅ |
| E | — | — | T₃=T₄ ≤30 | | — | ≤40 | — | DIAL TONE IS ALSO IN T₄ |
| — | — | — | — | — | — | — | — | — |
| X | — | ≤3 | — | T₂+3 ≤6 | — | ≤30 | — | DIAL TONE NOT REQUIRED TO BE DETECTED IN T₁~T₄ |
| RANGE | 0~4 | 0~3 | 0~4 | 3~60 | 0.8~1.2 | 10~60 | 60 | |

Fig. 5

| PARAMETERS / COUNTRIES | T₁ sec | T₂ sec | T₃ sec | T₄ (T₄') sec | T₅ sec. | T₆ sec | t_f msec | UNSUCCESSFUL INTERVAL | UNSUCCESSFUL FREQUENCY |
|---|---|---|---|---|---|---|---|---|---|
| A | 4 | 0 | 16 | 20 | 1 | 60 | 60 | 5 | 3 |
| B | 0 | 0 | 3 | 8 | 0 | 60 | 0 | 5 | 5 |
| C | 0 | 1 | 20 | 20 | 0 | 60 | 0 | 5 | 3 |
| D | 0 | 0 | 60 | 60 | 0 | 60 | 60 | 3 | 3 |
| E | 0 | 0 | 3 | *¹30 | 0 | 40 | 0 | 5 | 4 |
| ⋛ | ⋛ | ⋛ | ⋛ | ⋛ | ⋛ | ⋛ | ⋛ | ⋛ | ⋛ |
| X | 0 | 3 | 0 | 6 | 0 | 30 | 0 | 3 | 3 |

AUTOMATIC TELEPHONE DIALING METHOD AND APPARATUS

This application is a continuation of allowed application Ser. No. 759,911, filed July 29, 1985, now U.S. Pat. No. 4,741,029, which is in turn a C.I.P. of now abandoned application Ser. No. 741,737, filed June 4, 1985.

BACKGROUND OF THE INVENTION

1. Field of the Invention

The present invention relates to automatic telephone dialing method and apparatus for devices such as telephone sets, which method and apparatus can be used commonly in a plurality of different countries.

2. Description of the Related Art

There have heretofore been well known in the art telephone sets and other telephonic devices such as facsimile transmitters which can initiate a call to a desired party by specifying an abbreviated address to read out the corresponding full address of the party. These devices have different specifications in different countries since the telephone systems vary in standards, criteria, and control systems from country to country. Except for Japan and United States where the telephone systems are identical, it has been necessary for suppliers to design, manufacture, and supply telephonic devices with automatic telephone dialers to meet the specifications of each country concerned. As a consequence, the number of designing and manufacturing steps and the cost of manufacture have been increased, and especially the cost of devices to be exported to those countries which import only a small number of such devices sometimes becomes prohibitively high that they can no longer be supplied.

SUMMARY OF THE INVENTION

It is an object of the present invention to provide automatic telephone dialing method and apparatus designed for common use in different countries in enabling a telephonic device such as a telephone set connected to a private branch exchange to initiate a call to a telephonic device connected to a private branch exchange or a telephonic device connected to a PTT circuit, or enabling telephonic devices coupled to a PTT circuit, or enabling telephonic devices coupled to a PTT circuit to call each other.

According to an automatic telephone dialing method of the present invention, control data for controlling various signals to be delivered to a circuit for placing a call are stored in a storage unit, and the signals are issued while their timing is controlled by the control data stored in the storage unit at the time of initiating a call.

An automatic telephone dialing apparatus of the present invention is composed of an input unit for entering various items of control information used in placing a call, a storage unit for storing data, a control unit for controlling the entire operation of the apparatus, and a unit for issuing a dialing signal. The storage unit stores reference time values for determining the timing at which various signals are to be delivered to a circuit in placing a call, and also stores abbreviated address information, etc. The input unit can enter information to be stored in the storage unit and also a calling command. The dialing signal issuing unit serves to deliver the dialing signal to a telephone circuit. In operation, data items such as reference time values are stored in the storage unit, and when establishing a call, a full call address or an abbreviated address is entered through the input unit. Then, the control unit controls the specified call address according to the reference time values stored in the storage unit, and issues the call address to the circuit through the dialing signal issuing unit. Since the automatic telephone dialing apparatus of the invention controls the delivery timing of the call address according to the data such as reference time values stored in the storage unit, the apparatus can easily be suited to the communication environments and standards of different countries, and can be utilized in various telephone-related devices such as facsimile transmitters.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1b is a circuit diagram illustrating the detail of the block diagram in FIG. 1a.

FIG. 4 is a table of values prescribed for reference times T1 through T6, tf in various countries; and FIG. 5 is a diagram showing data items stored in a storage unit in a pattern corresponding to the table of FIG. 4.

DESCRIPTION OF THE PREFERRED EMBODIMENT

Figures 1A, 2:
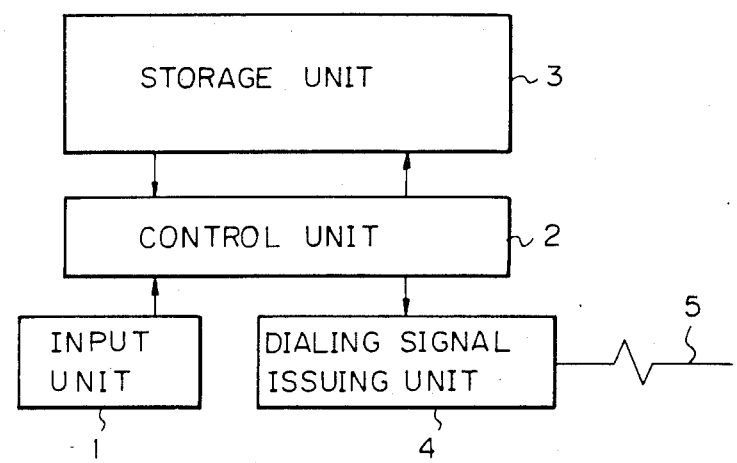
FIG. 1a is a block diagram explanatory of automatic telephone dialing method and apparatus according to an embodiment of the present invention.
FIG. 2 is a diagram illustrating a process of programming calling command information, employed in the embodiment of the present invention.

FIG. 1a shows in block form an arrangement employed for explaining automatic telephone dialing method and apparatus according to an embodiment of the present invention. An input unit 1 serves to enter data to be stored and calling information and also to command a call. A control unit 2 controls operation of the overall arrangement. A storage unit 3 serves to store reference time values which determine the delivery timing of various signals to be delivered to a telephone circuit 5 when establishing a call, abbreviated address information, and other data. A dialing signal is issued to the circuit 5 by a dialing signal issuing unit 4.

In operation, reference time values indicating the timing of signals to the circuit 5 are entered in advance through the input unit 1 and stored in the storage unit 3. These data items are normally stored in the storage unit 3 at the time of manufacturing the apparatus, but may be entered through the input unit 1 into the storage unit 3 as required. For an abbreviated address calling capability, party call addresses corresponding to abbreviated addresses are stored in respective addresses in the storage unit 3. When the call address of a party to be called is specified through the input unit 1 to place a call, the control unit 2 successively fetches the various reference time values stored in the storage unit 3, controls, according to the reference time values, the timing of delivery of various signals to be delivered, and then issues these signals to the circuit 5 through the dialing signal issuing unit 4. As a result, communication with the called party can now be started.

Figure 1B:
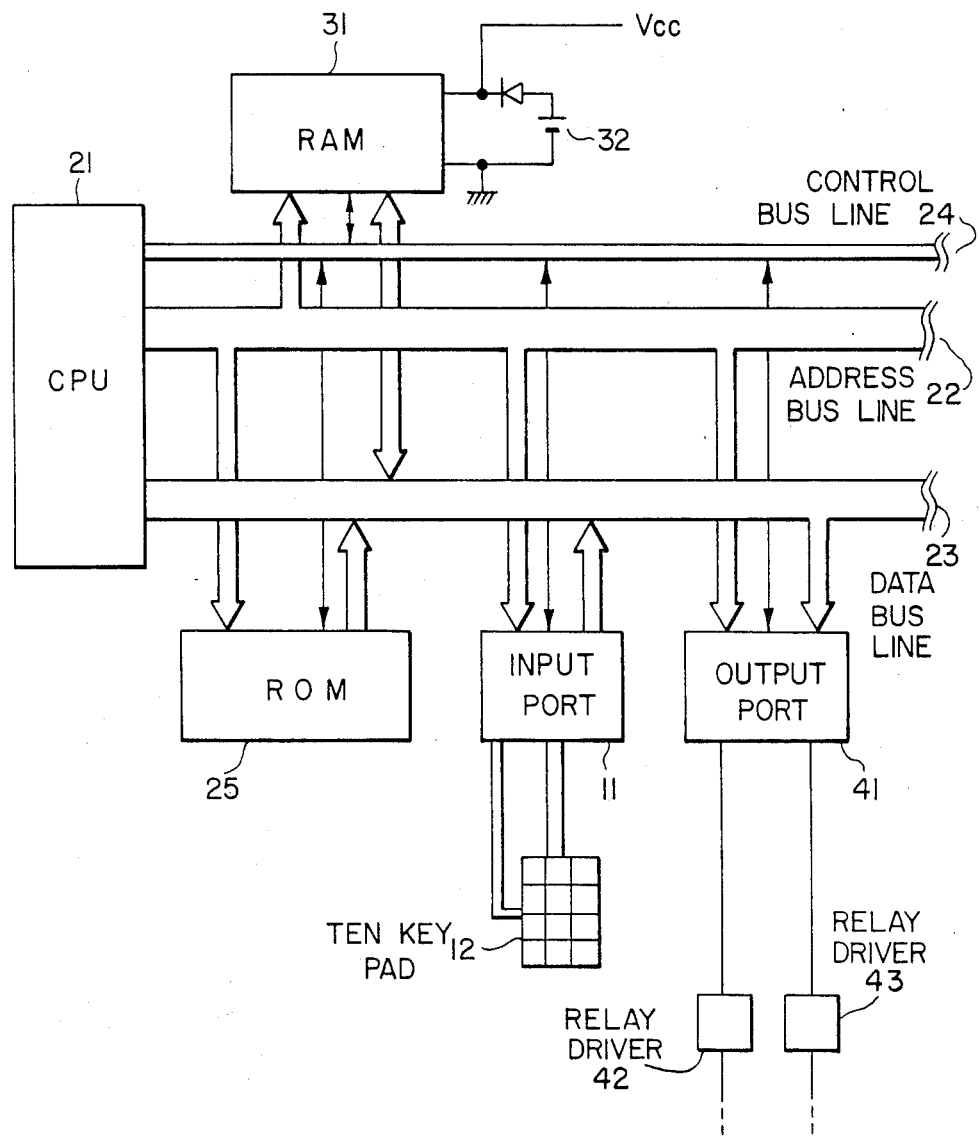

FIG. 1b shows a circuit diagram illustrating the detail of the block diagram in FIG. 1a. The control unit 2 in FIG. 1a consists of a microprocessor (CPU) 21, an address bus line 22, a data bus line 23, a control bus line 24, and ROM (Read Only Memory) 25 storing various programs for controlling the apparatus. The structure of the control unit 2 is similar to a conventional microcomputer, and the CPU 21 controls the whole apparatus by executing the control programs stored in ROM 25. A RAM 31 corresponds to the storage units 3 in FIG. 1a. The RAM 31 is connected to the each bus line 22, 23, 24 and read-in and read-out of data are carried out under the control of the CPU 2. Power for the RAM 31 is usually supplied from a power source Vcc obtained by rectifying a commercially available power supply, but can be supplied from a battery 32 during a power failure to avoid the loss of stored data. The input unit 1 in FIG. 1a consists of an input port 1 and a tenkey pad 12. The input port 11 detects signals for depressed keys in the tenkey pad and transfers these signals to the CPU 21 via the data bus line 23. An output port 41 and a relay drivers 42 and 43 correspond to the dialing signal issuing unit 4 in FIG. 1a.

FIG. 2 is illustrative of a process of programming calling command information, employed in the embodiment of the present invention. Designated at R is a symbol indicating that succeeding numbers are delivered to a private branch exchange (PBX), and Xp1 through Xpm are the addresses of parties connected to the PBX. If an address is a special number, then it represents that it will be delivered via the PBX to a PTT circuit. Denoted at Q indicates that succeeding numbers are delivered to the PTT circuit, X1 through Xn are telephone numbers, normally of six or seven figures, of parties on the PTT circuit, and P is a pause (normally ranging from 1 second to 3 seconds) which is inserted as required between items of information. Therefore, FIG. 2(1) shows that a call is laces to another party coupled to the PBX, FIG. 2(2) illustrates a call from the PBX to a party on the PTT circuit, and FIG. 2(3) shows a call from a terminal connected to the PTT circuit to another terminal of the PTT circuit. The call addresses are specified by the input unit 1 (FIG. 1) at the time of establishing calls, or are previously stored in the storage unit 3 and then read out of the storage unit 3 when specified by corresponding abbreviated addresses.

Figure 3:
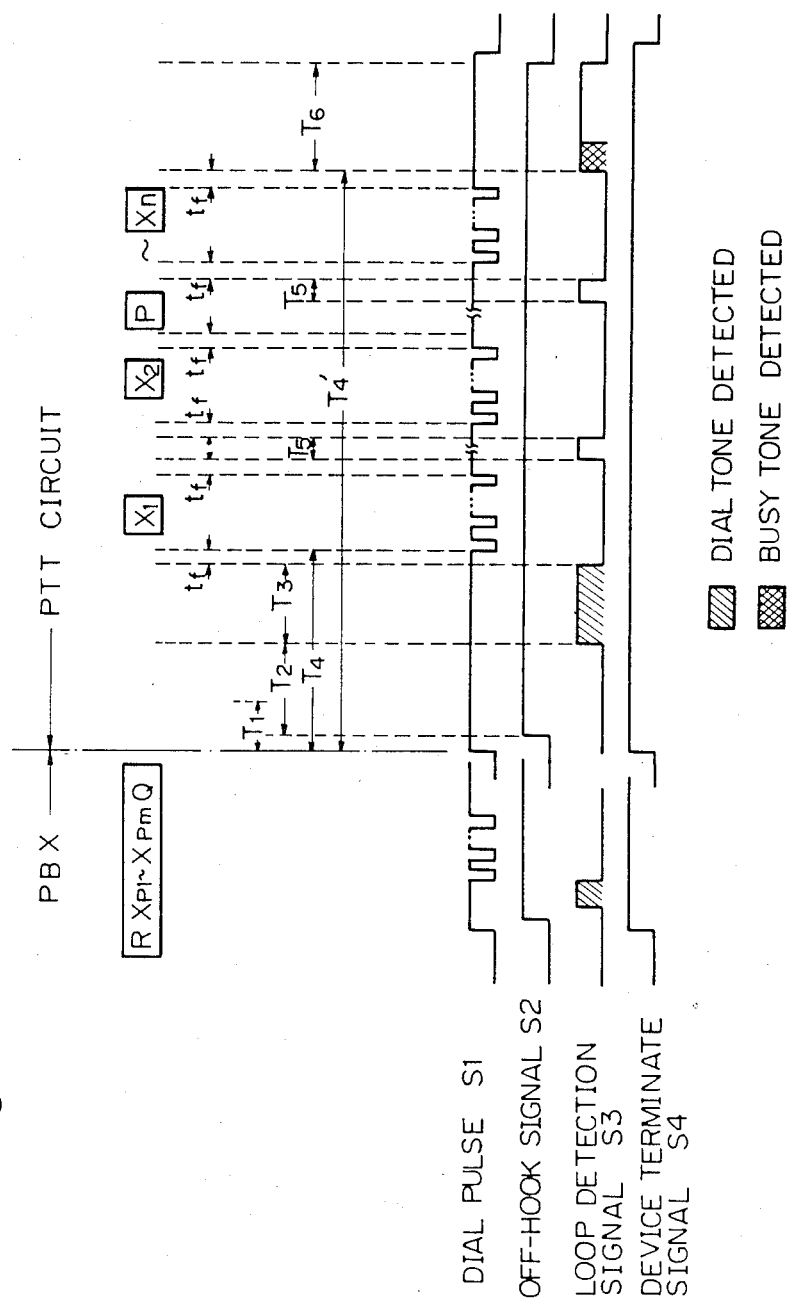
FIG. 3 is a timing chart showing the timing at which signals are issued when a call is initiated from a private branch exchange to a PTT circuit.

FIG. 3 shows the timing of delivery of signals when a call is initiated from the PBX to a party on the PTT, as illustrated in FIG. 2(2). Signals (indicated by the thick lines) on the lefthand side of the vertical dot-and-dash line in FIG. 3 are produced within the PBX, while signals on the righthand side are produced within the PTT circuit. Time periods T1 through T6 vary from country to country, and are stored as a parameter table in the storage unit 3 (FIG. 1). In this embodiment, these data items are stored in a ROM, and can be stored or altered in the factory or as required when the installation is serviced. The time period T1 is a time prescribed in respective countries for detecting a circuit current. If no circuit current is detected within the time T1, then the subsequent sequence must be interrupted. The time period T2 is a pause or idle time, prescribed in each country, prior to the detection of a dial tone. The time period T3 is a dial tone detecting time prescribed in each country; if no dial tone is detected within this time, then subsequent sequence must be interrupted. The time period T4 is a dial tone detecting time-out, prescribed in each country, after the PTT circuit has been connected to the PBX; if no dial tone is detected within this time, then subsequent sequence must be interrupted. The time period T4' is a time, prescribed in each country, requiring that all address or telephone number figures be dialed within this time. The time period T5 is a time, prescribed in each country, which requires that the subsequent sequence be interrupted should no circuit current in each circuit be detected within this time. The time period T6, for which various times are prescribed from country to country, is a time-out after the final address figure has been dialed; a busy tone is detected within this time, and when the busy tone is detected, the subsequent sequence must be interrupted immediately. The time period tf is a transient time, prescribed in each country, inserted before and after the detection of a circuit current in each interval between adjacent address figures.

Operation of the embodiment of the present invention will be described with reference to FIGS. 1, 2, and 3. The times T1 through T6 and tf are stored in the storage unit 3. The values of the times T1 through T6 and tf, and whether these times are required or not, vary from country to country.

When the user lifts the handset off its hook, an off-hook signal S2 goes high, and at the same time loop detection is effected and a device terminate signal S4 goes high. Then, when the address or telephone number of a party to be called is dialed in the format shown in FIG. 2(2), dial pulses S1 are delivered dependent on the number Xp1 through Xpm of one or more Figures which are employed for establishing a call from the PBX to the PTT circuit (the signals in the PBX are indicated by the thick lines in FIG. 3). Then, the telephone number X1 through Xn of the other party in the PTT circuit is issued following the symbol Q. In issuing the dial pulses corresponding to the telephone number X1 through Xn, the control unit 2 reads out the reference times T1 through T6 and tf stored in the storage unit 3, and controls the delivery timing of the signals for issuing the dialing signals from the dialing signal issuing unit 4 to the PTT circuit according to the timing chart of FIG. 3. The pause P is inserted as desired before and after each address or telephone number figure, and the pause time is set where the pause P is inserted.

FIG. 4 is a table showing the values prescribed in countries of major concern for the times T1 through T6 and tf illustrated in FIG. 3. Denoted at A, B, C, D, E, . . . X are countries, and the values of T1 through T6 (in sec.) and tf (in msec.) are reference times shown in FIG. 2 and prescribed according to the communication standards in the respective countries. For the country A, for example, the time T1 for detecting the circuit current is equal to or shorter than 4 seconds, the pause time T2 prior to the detection of a dial tone is not specified, the sum of the dial tone detecting time T3 and the circuit current detecting time T1 is the dial tone detecting time-out T4, equal to or shorter than 20 seconds, after the PTT circuit has been connected to the PBX, the circuit ;current detecting time T5 is equal to a time obtained by subtracting twice the transient time tf (ranging from 10 to 100 msec.) from a value in the range of from 0.8 to 1.2 seconds, and the time-out after the final telephone number figure has been dialed is equal to or shorter than 60 seconds. For the other countries B, C, ..., X, the values specified in the table are prescribed. (The bar "—" in the table means that no value is prescribed.) The values in the final line of the table indicates the ranges of respective reference times prescribed in the countries given in the table.

FIG. 5 represents the values stored in the storage unit 3 for the respective countries. The storage unit 3 may comprise a variety of memories, but comprises a ROM according to the present embodiment. The required data items are written in the ROM at the time of manufacturing the apparatus. Instead of the ROM, the storage unit 3 may comprise a read/write memory so that data can be written as desired into the storage unit 3 through the input unit 1. For the country E in FIG. 5, the time T4' is used in place of the time T4. A DIP switch is mounted on a substrate as a parameter for specifying such data and is employed to vary the meaning of the values. Where there is no reference time prescribed, "0" is stored in the storage unit 3. A desired country can be selected by varying a program patch, operating the DIP switch, or by various other means. The arrangement of the invention has an automatic redialing capability. More specifically, an interval for redelivering dialing signals and the number of repetitions or frequency of such dialing signal redelivery operations are stored in the storage unit 3 as shown in the two rightmost columns in FIG. 5. When a called party cannot be reached because of the circuit condition or because the circuit of the called party is busy, the stored interval and repetitive number are read for automatic redialing operation.

While in the above embodiment a call is given from the PBX to the PTT circuit, the calls such as shown in FIG. 2 at (1) and (3) may be established in a similar manner. Various signals in the PBX circuit, rather than the PTT circuit, may also be controlled in their delivery timing by storing reference times in the storage unit.

Figure 6:
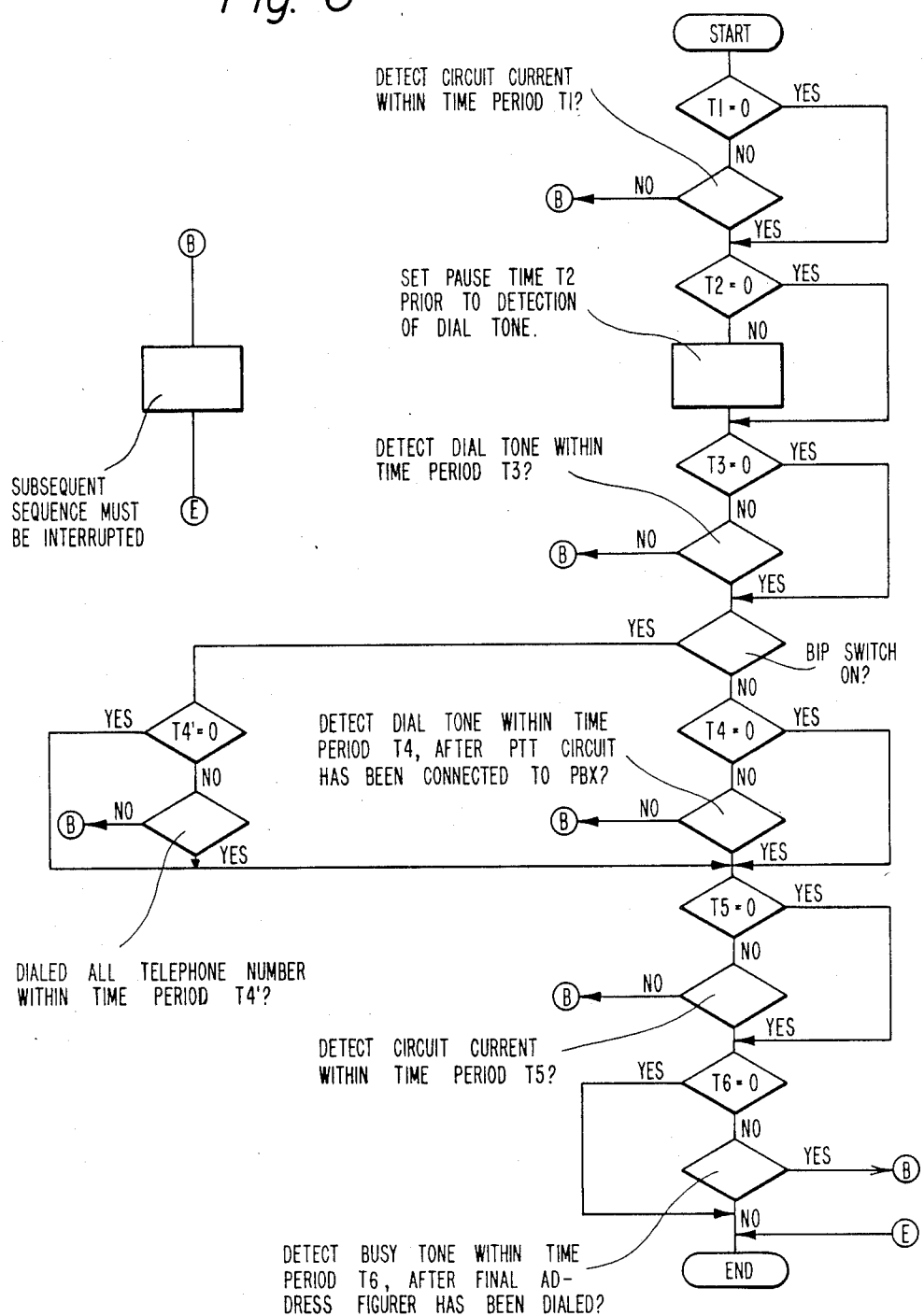
FIG. 6 is a flowchart which illustrates the operation of the CPU 21 illustrated in FIG. 1b.

FIG. 6 shows a flowchart which illustrates the schematic operation of the CPU 2 in delivering various signals according to the reference time value T1 to T6. In the block F1 and F2, if the time period T1 is not zero and a circuit current is not detected within the time period T1, then the subsequent sequence must be interrupted (block F16), otherwise operation is transfered to the block F3. If the time period T2 is not zero, a pause time T2 is set prior to the detection of a dial tone, otherwise control is transferred to the next block. In the block F5, a program is performed to determine whether the time period T3 is zero or not. If the time T3 is not zero, and no dial tone is detected within the time period T3, then operation is transferred to the block F16, otherwise, operation is transferred to the block F7. If the switch parameter (DIP switch) is switched on, the control is transferred to the block F10, otherwise, the control is transferred to the block F8. If the time period T4 is not zero and no dial tone is detected within the time period T4 after the PTT circuit has been connected to the PBX (block F9), then the subsequent sequence must be interrupted (block F16). Otherwise, operation is transferred to the block F12. In the block F10 and F12, if the time period T4' is not zero and all telephone number figures are not dialed within the time period T4', then the subsequent sequence must be interrupted (block F16). Otherwise, the operation is transferred to the block F12, in which a program is performed to determine whether the time period TS is zero or not. If the time period TS is not zero and no circuit current in each circuit is detected within the time period TS, then the subsequent sequence must be interrupted (block F16). Otherwise, the operation is transferred to the block F14. In the block F14 and F15, if the time period T6 is not zero and a busy tone is detected within the time F6 after the final address figure has been dialed, then the subsequent sequence is interrupted.

With the present invention, as described above, an automatic telephone dialer and a device having an automatic telephone dialing capability can easily be realized to meet the communication environments and standards of various countries. Therefore, the present invention is advantageous in that telephonic devices designed for use in different countries can economically be manufactured. The present invention can be incorporated in all types of network-controlled devices such as telephone-related devices, key telephone, facsimile, and simultaneous transmissive communication.

Although a certain preferred embodiment has been shown and described, it should be understood that many changes and modifications may be made therein without departing from the scope of the appended claims.

What is claimed is:

1. An automatic telephone dialing apparatus for delivering dial pulses to a telephone circuit in placing a call while controlling each timing of delivery of the dial pulses and controlling a call origination according to a plurality of stored reference time values, said automatic telephone dialing apparatus comprising:

(a) a storage unit for storing first control data used for controlling each timing of the dial pulses to be delivered to the telephone circuit, and for storing second control data used for comparing with time values of signals from the telephone circuit;

(b) an input unit for specifying an address representing a subscriber to be called, and for entering said first and second control data into said storage unit;

(c) a dialing signal issuing unit for issuing dial pulses to the telephone circuit;

(d) a first control unit for controlling the timing of each delivery of the dial pulses according to said first control data stored in said storage unit;

(e) a comparing means for comparing said second control data stored in said storage unit with time values of signals received from the telephone circuit;

(f) a second control unit for controlling a call origination in accordance with results of respective comparisons by said comparing means.

* * * * *